Sept. 20, 1949.   P. A. ROOS   2,482,598
REFLECTING SURFACE REPLICA
Filed March 22, 1946
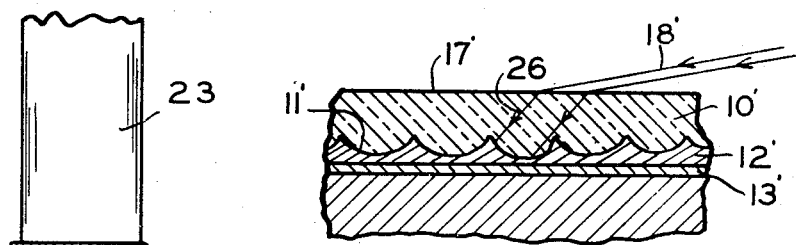
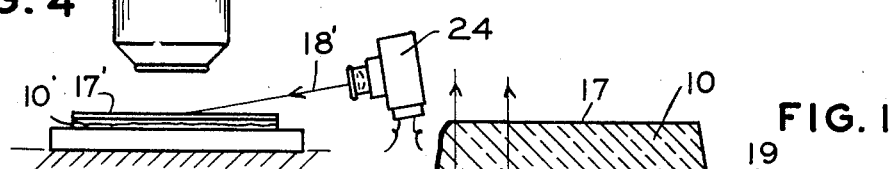
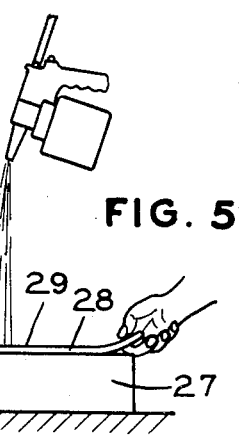
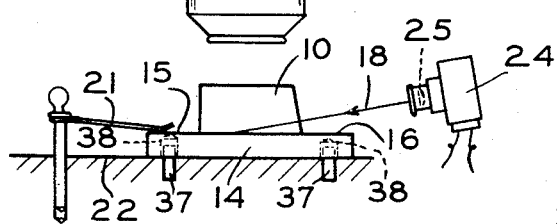
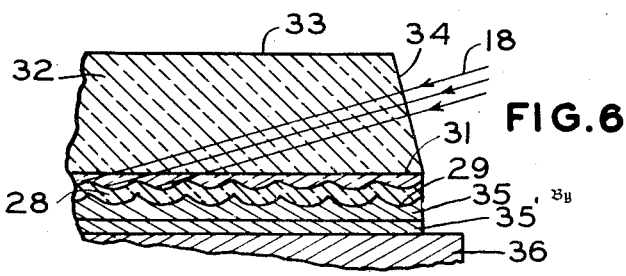
PAUL A. ROOS
Inventor
Attorney Patented Sept. 20, 1949

2,482,598

UNITED STATES PATENT OFFICE 2,482,598

REFLECTING SURFACE REPLICA

Paul A. Roos, Greece, N. Y., assignor to Bausch & Lomb Optical Company, Rochester, N. Y., a corporation of New York Application March 22, 1946, Serial No. 656,481

3 Claims. (Cl. 88—1)

The present invention relates to a surface replica and more particularly to a surface replica for use as a comparison standard in surface comparison microscopes.

It is an object of the present invention to provide a novel device of the above type which is simple and economical to produce and use.

It is another object to provide such a replica surface which may be viewed under substantially the same conditions as the original surface from which the replica was made.

It is a further object to provide such a device with optical surfaces favorable for viewing and lighting the replica surface.

It is a further object to provide such a device which may be viewed as a direct positive replica of the original surface.

Further objects and advantages will be apparent to those skilled in the art by reference to the description taken in connection with the accompanying drawing in which, Fig. 1 is a cross section on an enlarged scale of the preferred embodiment of the invention, Fig. 2 is a semi-diagrammatic view of the preferred embodiment of the invention with the replica surface in viewing position beneath a microscope, Fig. 3 is a cross section on an enlarged scale of a second embodiment of the invention, Fig. 4 is a view showing the second embodiment of the invention in viewing position under a microscope, Fig. 5 is a semi-diagrammatic view illustrating a method for producing a third embodiment of the invention and, Fig. 6 is an enlarged cross sectional view of the third embodiment of the invention.

In the preferred form of the invention, as shown in Fig. 1 of the drawing, the surface replica is made from a block 10 of colorless transparent plastic material which has a true replica of a standard surface (not shown) formed on its lower surface 11 by any suitable plastic forming process. In the preferred process, as shown in Figs. 1 and 2, the block 10 is formed by molding plastic molding material such as methyl methacrylate against the standard surface, not shown, which is placed in the bottom of a plastic-forming mold. The mold is filled with molding material and heat and pressure are applied thereto according to the best molding technique. When the molding material becomes a homogeneous solid, the mold is cooled to allow the plastic block 10 to harden. When the block 10 is set hard, it is removed from the standard surface and now has the characteristic surface markings of the standard surface exactly reproduced on the replica surface 11. Replica surfaces of standard surfaces on metals or other materials may thus be produced in a simple manner.

A layer of light-reflective material 12, such as silver, is then deposited in any suitable manner such as by chemical or electrical deposition on the replica surface 11 to a thickness preferably sufficient to render the layer opaque to the passage of light therethrough.

Means for protecting the metallic light-reflective layer 12 from oxidation are provided by copper plating the layer and means are additionally provided for mechanically protecting the layers by coating the copper plating with lacquer 13. Further means for mechanically protecting the reflective layer 12 may be provided in any preferred manner such as a base plate 14 which is adhesively connected to the replica side of the block 10 and which may be extended sidewise to form the shoulders 15 and 16 (Fig. 2) to aid in handling and holding the block 10. The upper face 17 of the block 10 is formed with optical flatness so that the replica surface 11, as viewed by the observer through face 17, appears as a positive reproduction of the original surface under illumination of light rays 18 passing into the block to the reflective layer 12 and thence reflected to the eye of the observer. As shown in Figs. 1 and 2, light is preferably projected onto the replica surface 11 at grazing incidence for most advantageous illumination through an inclined polished optical surface 19 on the side of the block 10.

In use, the replica surface 11 is secured by suitable means such as the clamp 21 on a stage 22 in viewing position beneath a surface comparison microscope 23. A light source 24, having a suitable lamp energized from any desired source of power and having a collimator lens 25 therein, directs substantially parallel light rays 18 normal to the optical surface 19 onto the replica surface 11 at approximately grazing incidence as already set forth.

The modification illustrated in Figs. 3 and 4 comprises a transparent plastic block 10' having the replica surface 11' bearing the reflective layer 12' which may be protected by a layer of copper plating, not shown, and a lacquer coating 13'. The upper face 17' of the block 10' is optically polished so that the replica surface 11' may be viewed therethrough. The principal difference between the structures shown in Figs. 1 and 3 is the mode of illumination of the replica surface 11'. The light rays 18' in Figs. 3 and 4 strike the upper face 17' at grazing incidence and are refracted at the top surface as shown at 26 onto the replica surface 11'. Since no optical surface, such as that shown at 19 in Fig. 1, is needed for illumination in this form of the invention, the block 10' may be comparatively thin.

The process of making the surface replicas illustrated in Figs. 1 and 3 may be modified in its first steps by initiating the manufacture thereof with a solid transparent block 10 of plastic material. In the modified method of manufacture, the lower face 11 of the block 10 is first chemically softened by the use of a suitable solvent. The block is then immediately pressed against a standard surface, not shown, and subsequently allowed to harden. When the replica surface 11 is sufficiently firm, the block 10 is removed from the standard surface and the subsequent operations of reflectively coating and protecting the replica surface 11 may, if desired, follow the method outlined in Figs. 1 and 2.

It is usually easier for the operator of a surface comparison microscope to compare surfaces which appear to be substantially identical in characteristic colors. This may be accomplished in the present invention by suitably coloring the plastic block 10 or by depositing the light-reflective film 12 by sputtering or evaporation in vacuum from a metal or other material having color characteristics similar to a specified surface under comparsion. Thus, when a brass specimen surface is to be examined for surface roughness, the reflecting layer 12 on the standard replica surface would consist of brass material which could be deposited by sputtering or thermal evaporation, for example.

Another embodiment of the invention, shown in Figs. 5 and 6, is produced by a process wherein a hardenable liquid transparent material is deposited on the standard surface 27 by any advantageous means such as spraying to build up a layer 28 or desired thickness. The layer 28 is then allowed to harden and is subsequently peeled off the standard surface 27 as shown in Fig. 5 leaving the characteristic markings of the standard surface 27 formed on the replica surface 29. The surface of the layer opposite to the replica surface 29 is adhesively connected in any desired manner, such as by transparent cement 31, to a transparent plastic block 32 having the optical surfaces 33 and 34 thereon similar to the block 10 in Fig. 1. It will be understood that the refractive index of the block 10, layer 28, and cement 31 is substantially the same to prevent internal refraction of the light rays 18 near the replica surface 29. A coating of light-reflective material 35 is then deposited on the replica surface 29 and after the coating 35 is copper plated and coated with lacquer 35', the block 32 may be mounted on a base 36 in a manner similar to that shown in Fig. 1.

When examining certain types of surfaces with a comparison microscope, it is sometimes necessary that the surface markings be oriented in a fixed manner. This can be readily accomplished by means of locating pins 37 which are fixed to the stage 22 and adapted to cooperate with openings 38 formed on the under side of plate 14.

Although but certain embodiments of the invention have been shown and described in detail, it will be understood that changes may be made in the arrangement and shape of the parts without departing from the spirit of the invention as defined in the appended claims.

I claim:

1. A surface replica used as a comparison standard in a surface comparison microscope comprising a block of transparent plastic material having a replica surface thereon, a coating of light-reflecting material deposited on said replica surface, an optical surface on said block opposite to the replica surface for viewing said replica surface through said block, and a second optical surface on said block angularly disposed to the first optical surface through which the replica surface may be illuminated by light rays at grazing incidence.

2. A surface replica used as a comparison standard in a surface comparison microscope comprising a block of transparent plastic material having a replica surface thereon, means including a light-reflective film deposited on said replica surface for imparting to the replica surface substantially the same characteristics and appearance as the original surface from which the replica was made, a protective covering for said film, an optical surface on said block opposite said replica surface through which the replica surface is viewed, and a second optical surface on the block and angularly disposed to the first surface through which the replica may be illuminated by light rays at grazing incidence.

3. A surface replica used as a comparison standard in a surface comparison microscope comprising a block of transparent plastic material having a replica surface thereon, a coating of light-reflecting material joined to said replica surface, a protective covering for said light-reflective material, an optical surface on said block opposite to the replica surface for viewing said replica surface through said block, a second optical surface on said block angularly disposed to the first optical surface through which the replica surface may be illuminated by light rays at grazing incidence.

PAUL A. ROOS.

REFERENCES CITED

The following references are of record in the file of this patent:

UNITED STATES PATENTS

| Number | Name | Date |
|---|---|---|
| 818,966 | Ives | Apr. 24, 1906 |
| 1,744,642 | Kondo | Jan. 21, 1930 |
| 2,022,639 | Stimson | Nov. 26, 1935 |
| 2,221,890 | Williams | Nov. 19, 1940 |
| 2,232,551 | Merton | Feb. 18, 1941 |
| 2,239,263 | Waine et al. | Apr. 22, 1941 |
| 2,282,643 | Cutting | May 12, 1942 |
| 2,370,562 | Meunier | Feb. 27, 1945 |
| 2,380,447 | Jurgersen | July 31, 1945 |
| 2,387,581 | Hansen | Oct. 23, 1945 |

FOREIGN PATENTS

| Number | Country | Date |
|---|---|---|
| 358,378 | Great Britain | Oct. 8, 1931 |